No. 774,465.　　　　　　　　　　　　　　　　　　　　　　　Patented November 8, 1904.

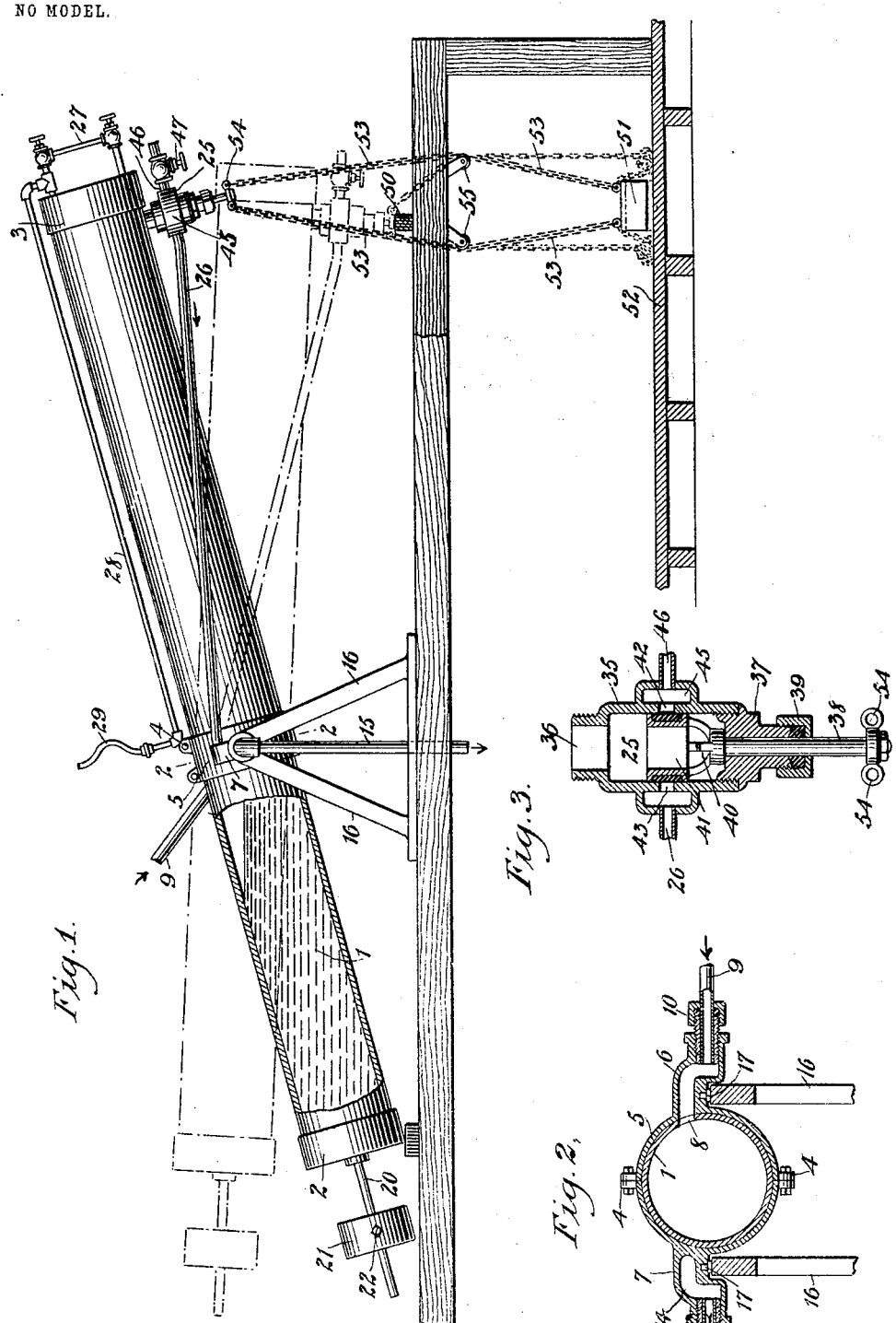

UNITED STATES PATENT OFFICE.

JAMES CAMPBELL, OF PORT BLAKELEY, WASHINGTON.

STEAM-TRAP.

SPECIFICATION forming part of Letters Patent No. 774,465, dated November 8, 1904.

Application filed December 1, 1902. Serial No. 133,488. (No model.)

*To all whom it may concern:*

Be it known that I, JAMES CAMPBELL, a citizen of the United States, and a resident of Port Blakeley, in the county of Kitsap and State of Washington, have invented certain new and useful Improvements in Steam-Traps, of which the following is full, clear, and exact description, reference being had to the accompanying drawings, forming part of this specification.

The object of my invention is to provide a steam-trap with an outlet-valve mechanism and means for positively operating the same actuated by the movement of the trap, thereby rendering the action of the trap simple, certain, and effective; and my invention consists in the novel structural features and combinations hereinafter described and claimed.

In the accompanying drawings, Figure 1 is a side elevation, partly in section, of my trap, the dotted lines showing the trap in position for discharging the accumulation of water. Fig. 2 is a central cross-section on the line 2 2, Fig. 1. Fig. 3 is a sectional view of the outlet-valve mechanism.

In the particular type of steam-trap illustrated and described 1 is the trap-chamber, consisting of a section of tubing, the ends of which are closed by the caps 2 and 3. Upon the exterior of the chamber is clamped by suitable fastening devices 4 a trunnion-band 5, having the arms 6 and 7. The arm 6 is cored throughout its length to form a passage to the interior chamber 1 when the band 5 is clamped in position to register with the opening 8 in the wall of the chamber. The feed-pipe 9 enters said passage and is secured to the arm 6 by means of a swivel-joint, comprising a gland and stuffing box 10, which permits the rocking motion of the trap, hereinafter referred to, without affecting the tightness of the joint. The opposite end of the pipe 9 is connected with the coils or other apparatus to be trapped. Thus a direct passage is afforded to the interior of the trap free from valves or other moving parts. The opposite arm 7 is also cored out to form a chamber 14, with which the discharge-pipe 15 is connected by a joint similar to that employed for the feed-pipe. The chamber 1 is fulcrumed upon supports 16, which rest on any suitable foundation, by means of the knife-edges 17, which are secured to the under sides of the arms 6 and 7 and the edges of which rest in shallow grooves formed in the apices of the supports 16.

To the shorter end of the chamber 1 is secured a guide 20, upon which is mounted the counterweight 21. This can be adjusted to any position upon the guide 20 and there secured by means of a set-screw 22.

Upon the longer end of the chamber 1, at or near the extremity, is secured a discharge-valve 25, which will be more particularly described hereinafter. A pipe 26 connects the discharge-valve 25 with the chamber 14 in the arm 7. The discharge-valve is thus in direct communication with the discharge-pipe 15. This longer end of the chamber 1 is also provided with a suitable gage-glass 27, and an equalizing-pipe 28 is connected with this end of the chamber at or near its highest point and the apparatus to which the trap is connected to equalize the pressure between them. The equalizing-pipe preferably extends toward the center of motion of the chamber 1 and is there provided with a flexible joint 29. The discharge-valve 25 comprises a cylindrical body or casing 35, having its inlet 36 secured directly to the trap-chamber 1 and provided with a bonnet 37, through which passes the valve-stem 38. A suitable stuffing-box 39 is carried by the valve-bonnet. Secured to the valve-stem 38, by means of the three-armed yoke 40, is an outlet-controlling device 41, which consists of a ring or annulus closely fitting the interior of the valve-body and which is arranged to cover and close the discharge-ports 42 and 43 when the yoke 40 rests against the valve-bonnet. The object in making this outlet-controlling device in the form of a ring is to perfectly balance it in whatever position it may be in the valve-chamber. The valve-body 25 is provided with an exterior annular chamber 45, to which are fitted the discharge-pipe 26 and the drainage-outlet 46, the latter being provided with a suitable valve 47. The ports 42 and 43 establish communication between the valve-chamber and the exterior annular chamber 45. It will thus be seen that when the outlet-controlling device 41 covers the ports 42 and 43, as shown in Fig. 3, the discharge-outlet of the trap will be closed, and when the outlet-controlling device is moved up to the upper part of the chamber the ports 42 and 43 will be uncovered and communication established between the interior of the trap-chamber and the discharge-pipe 26 through the outlet-controlling device.

For the purpose of moving the outlet-controlling device to uncover the discharge-ports 42 43 I arrange below the trap a stop 50, which will engage the lower end of the valve-stem before the trap quite reaches its discharging position, so that the further movement of the trap will cause the outlet-controlling device to be moved up into the valve 25 to uncover the ports 42 43.

For the purpose of closing the discharge-ports and maintaining them closed when the trap is in receiving position I provide a resisting device, which as the trap moves into its receiving position impedes or arrests the movement of the valve-stem without arresting the movement of the trap and the valve-body carried thereby, so that just as the trap is about to reach its receiving position the outlet-controlling device 41 will be moved relatively to the valve into the position shown in Fig. 3 to close the ports 42 and 43. In one of its preferred forms this resisting device comprises a weight 51, which when the trap is in discharging position will be held upon any suitable support, such as the platform 52. The weight 51 is connected with the valve-stem by the flexible connections 53, chains preferably being employed for that purpose, as shown in Fig. 1. The chains are connected with lugs 54 on the valve-stem and pass downwardly through an opening in the support upon which the trap is mounted over guide-rollers 55 and are secured to the weight 51 in any suitable manner. The length of the connections 53 is such that the connections 53 will not become taut until just before the trap reaches its receiving position. The guide-rollers 55 support the chains and prevent them from becoming entangled.

The operation of the particular form of apparatus which I have just described as embodying my invention is as follows: The trap being in the position shown in full lines in Fig. 1, the water of condensation from the coils or other apparatus to which the trap may be connected will flow freely into the trap-chamber, gradually filling it. The counterweight 21 should be so set and adjusted that the chamber 1 must be full or nearly full before the weight of the longer end and its contents will overbalance the counterweight. When this occurs, the trap-chamber will tilt and the longer end will descend, the weight 51 descending also and resting upon the support 52. Just before the trap reaches its discharging position, which is indicated in dotted lines, Fig. 1, the lower end of the stem-valve will contact with the stop 50 and prevent the further movement of the valve-stem. As the valve-body will continue to descend, however, until the descent of the trap reaches its lower limit of movement, the outlet-controlling device 41 will approach the upper end of the valve-chamber and will uncover the ports 42 and 43. Communication will then be established between the discharge-pipe 26 and the interior of the trap-chamber, and the pressure in the trap-chamber will cause the water of condensation therein to flow out through the discharge-pipe into any suitable receptacle. When in this way the water of condensation in the trap has been discharged, the preponderance of weight will be transferred to the shorter end and that end of the trap will descend, causing the opposite end to rise. Just before the longer end of the trap reaches its upper limit of movement the slack in the connections 53 will have been taken up, and the weight 51 will resist the further upward movement of the valve-stem and will draw it toward the lower end of the valve-chamber, and thus cover the ports 42 and 43, shutting off the discharge-pipe from communication with the interior of the trap-chamber. The trap-chamber will then commence to fill, and when sufficiently full, as before, the above-described operation will be repeated.

It will be understood, of course, that various modifications may be made both in the form and construction of the trap and in the details and arrangement of the discharge-valve and resisting device without departing from the spirit of my invention.

In thus mounting the discharge-valve upon the exterior of the trap and providing means for positively actuating the valve which are controlled by the movement of the trap itself I obviate entirely the necessity of employing mechanism which is concealed within the body of the trap, and all the controlling parts are in plain sight, where their operation can be readily observed and any failure to operate properly easily and quickly remedied.

I prefer to employ the weight arranged substantially as shown for the purpose of actuating the outlet-controlling device, because it is absolutely positive in its action, which would not be the case were springs employed, and, furthermore, the weight furnishes a yielding resistance and prevents any undue shock to the valve or its connected parts.

Having thus described my invention, what I claim as new, and desire to secure by Letters Patent, is—

1. In a steam-trap, the combination of a tilting chamber, an outlet-valve secured thereto and provided with a movable outlet-controlling device, a resisting device which is brought into operation by the movement of the trap, for closing the valves as the trap approaches its receiving position and holding it closed until the trap passes beyond such closing position on its return movement to discharging position, and a device for opening said valve as the trap approaches the limit of its movement to discharging position.

2. In a steam-trap, the combination of a tilting chamber, an outlet-valve secured thereto and provided with a movable outlet-controlling device, a yielding resisting device which is brought into operation by the movement of the trap, for closing the valve as the trap approaches its receiving position and holding it closed until the trap passes beyond such closing position on its return movement to discharging position, and a device for opening said valve as the trap approaches the limit of its movement to discharging position.

3. In a steam-trap, the combination of a tilting chamber, an outlet-valve secured thereto and provided with a movable outlet-controlling device, means for actuating said outlet-controlling device to open the valve as the trap approaches discharging position, a weight, a support arranged to receive said weight while the trap is discharging and flexible connections between the weight and the outlet-controlling device which support the weight when the trap is in receiving position.

4. The combination of a steam-trap, of a tilting chamber, an outlet-valve having receiving and discharge ports and a balanced outlet-controlling device for the discharge-ports and means for actuating the outlet-controlling device to close the discharge-ports as the trap approaches its receiving position and means for opening said ports as the trap approaches the limit of its movement toward discharging position, substantially as set forth.

JAMES CAMPBELL.

Witnesses:
T. POWELL,
GEO. T. McLAUGHLIN.